United States Patent
Ma et al.

(10) Patent No.: US 12,404,412 B2
(45) Date of Patent: Sep. 2, 2025

(54) REFLECTIVE AND TEXTURED FINISH COMPOSITION AND THE METHODS OF MAKING AND USING THE SAME

(71) Applicant: SIKA TECHNOLOGY AG, Baar (CH)

(72) Inventors: Liyan Ma, Baar (CH); Chongjun Jiang, Baar (CH); Paulo Goncalo, Baar (CH)

(73) Assignee: SIKA TECHNOLOGY AG, Baar (CH)

( * ) Notice: Subject to any disclaimer, the term of this patent is extended or adjusted under 35 U.S.C. 154(b) by 698 days.

(21) Appl. No.: 17/438,499

(22) PCT Filed: Mar. 13, 2019

(86) PCT No.: PCT/IB2019/000287
§ 371 (c)(1),
(2) Date: Sep. 13, 2021

(87) PCT Pub. No.: WO2020/183213
PCT Pub. Date: Sep. 17, 2020

(65) Prior Publication Data
US 2022/0145091 A1    May 12, 2022

(51) Int. Cl.
*C09D 133/04* (2006.01)
*C09D 5/02* (2006.01)
(Continued)

(52) U.S. Cl.
CPC ............. *C09D 5/004* (2013.01); *C09D 5/022* (2013.01); *C09D 5/028* (2013.01); *C09D 7/70* (2018.01);
(Continued)

(58) Field of Classification Search
CPC ........ C09D 5/004; C09D 5/022; C09D 5/028; C09D 7/70; C09D 133/04; C09D 175/04;
(Continued)

(56) References Cited

U.S. PATENT DOCUMENTS 6,617,386 B2    9/2003    Lelli et al.
6,887,922 B1    5/2005    Roddis
(Continued)

FOREIGN PATENT DOCUMENTS

JP    2004160898 A  *  6/2004
KR    2003-0059851 A    7/2003
WO    2012/007529 A2    1/2012

OTHER PUBLICATIONS

Yamada et al., JP-2004160898 (Year: 2004).*
(Continued)

*Primary Examiner* — Peter F Godenschwager
*Assistant Examiner* — Zhen Liu
(74) *Attorney, Agent, or Firm* — Oliff PLC

(57) ABSTRACT

A reflective textured finish composition easy to use and with enhanced solar reflectance. Composition includes an acrylic latex/binder, a specific kind of aggregates, a rheology modifier and a surface modifier, as well as a pigment to form a textured composition that provides a solar reflectance equals and/or higher than 25%, a beautiful atheistic appearance, improved scrub resistance and water repellency. The aggregate is preferably a glass, and/or a quartz of the materials that have a minimum of 3% particles possessing sphericity equals to and/or less than 0.5, and/or roundness equals to and/or less than 0.29. The reflective textured metallic finish composition can be used at both exterior and interior walls. It can be also used as a grout for kitchen counter top, floor and/or anywhere for decorative purposes.

9 Claims, 5 Drawing Sheets

(51) Int. Cl.
*C09D 5/33* (2006.01)
*C09D 7/40* (2018.01)
*C09D 175/04* (2006.01)

(52) U.S. Cl.
CPC ......... *C09D 133/04* (2013.01); *C09D 175/04* (2013.01)

(58) Field of Classification Search
CPC ................ C08G 18/0866; C08G 18/10; C08G 18/246; C08G 18/4277; C08G 18/7621; C08K 7/04
See application file for complete search history.

(56) References Cited

U.S. PATENT DOCUMENTS

| | | | |
|---|---|---|---|
| 9,408,784 B2 * | 8/2016 | Hilliard, Jr. .......... | A61K 8/0237 |
| 10,625,534 B2 * | 4/2020 | Richert .................. | B42D 25/30 |
| 2002/0103283 A1 * | 8/2002 | Elfring ................ | C09D 201/00 |
| | | | 524/451 |
| 2010/0104809 A1 | 4/2010 | Duda et al. | |
| 2013/0102216 A1 * | 4/2013 | Turner ..................... | C09D 7/61 |
| | | | 428/424.7 |
| 2014/0272302 A1 | 9/2014 | Ciuperca | |
| 2018/0215945 A1 * | 8/2018 | Zhang ..................... | C09D 7/69 |

OTHER PUBLICATIONS

Yamada, JP2004160898-MT (Year: 2004).*
"ISO 13322-2:2006", International Standard, Nov. 1, 2006, XP009501515.
Dec. 2, 2019 International Search Report issued in International Patent Application No. PCT/IB2019/000287.
Dec. 2, 2019 Written Opinion of the International Searching Authority issued in International Patent Application No. PCT/IB2019/000287.

* cited by examiner

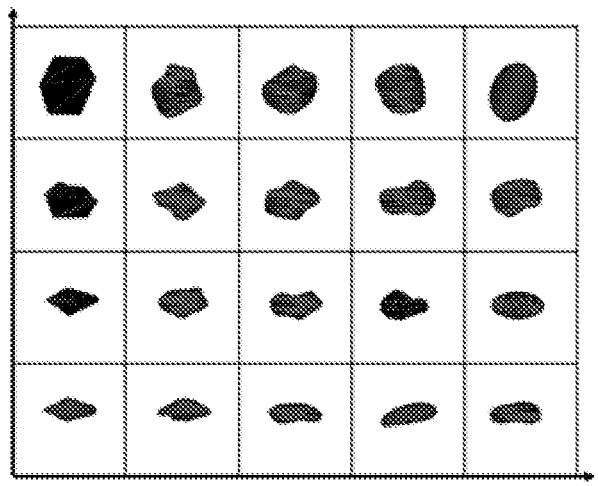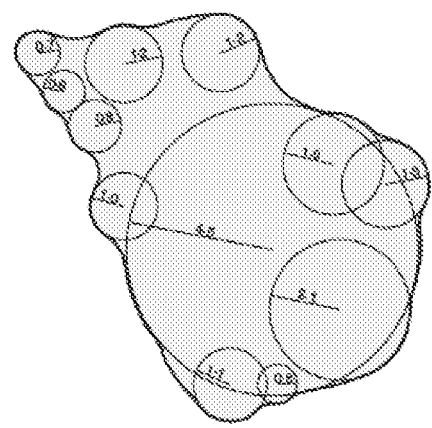
Figures 3a & 3b
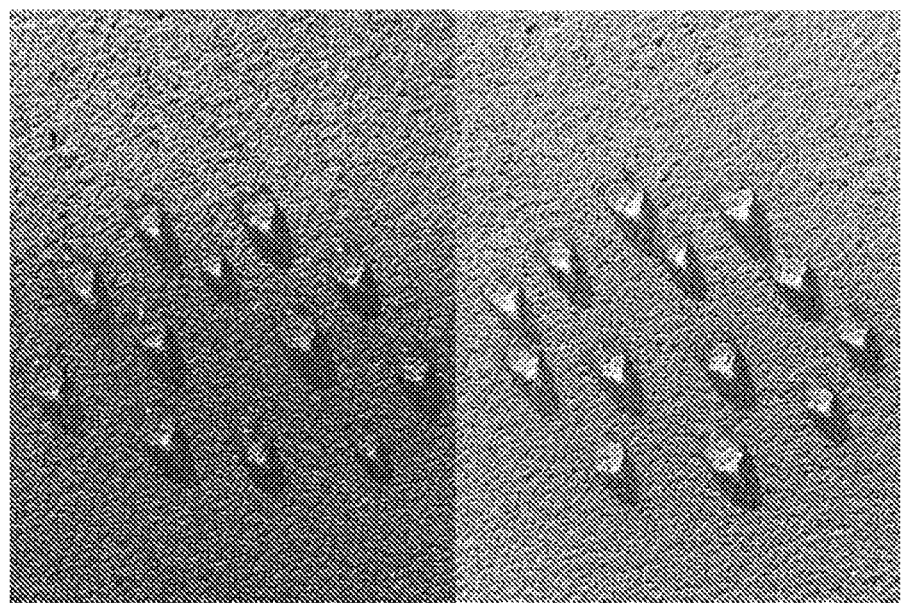
Figures 4a & 4b

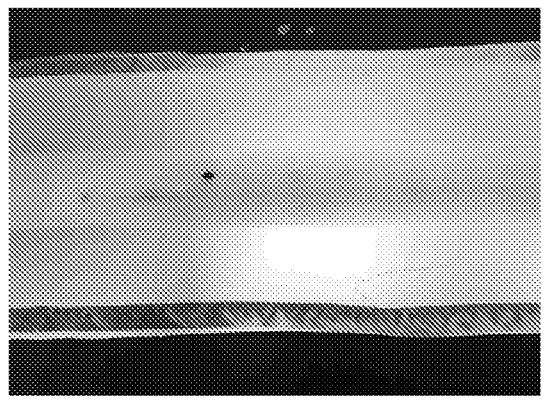 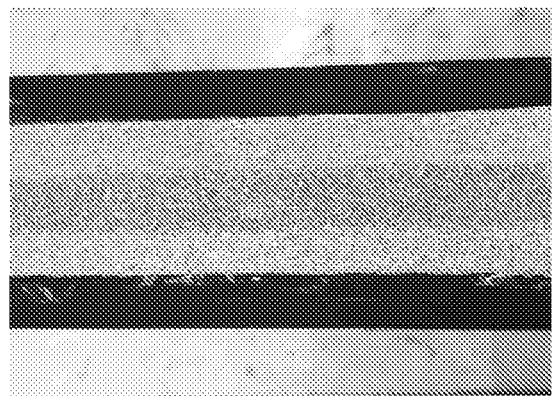
(a) (b)
Figures 7a & 7b
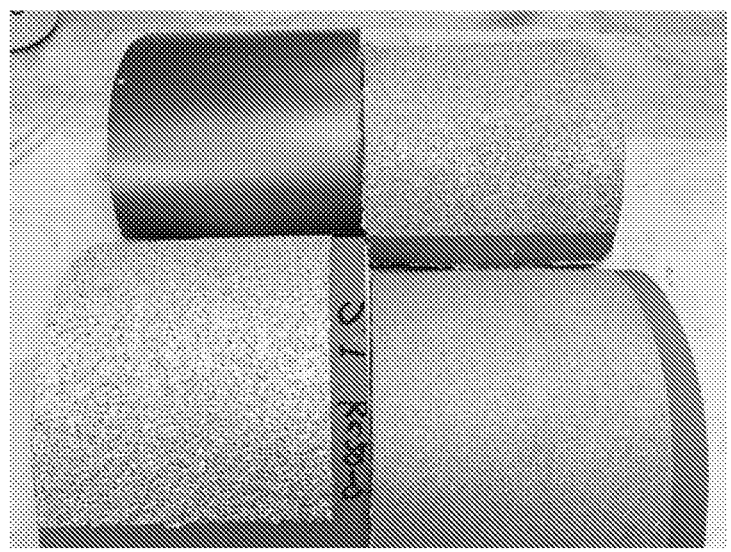
Figures 8a & 8b

REFLECTIVE AND TEXTURED FINISH COMPOSITION AND THE METHODS OF MAKING AND USING THE SAME

FIELD OF THE INVENTION

The technical field of the invention relates to structural finishes, notably for the interior or exterior of buildings or civil engineering structures, such as finishes for the external thermal insulation as well as joints/grouts for the construction.

In particular, the invention concerns a reflective textured, e.g. satin or metallic, finish [preferably "ready to use"] composition, with a high degree of solar reflectance for both exterior and interior of a building or structure. More particularly, the present invention relates to the incorporation of a unique aggregate within a finish composition which exhibits desired physical properties, including solar reflectance, textured appearance and durability.

The invention concerns also the method of preparation of this composition and wet formulations, as well as the method of using the composition through its application onto the surface of buildings or civil engineering works.

The so obtained finishes as well as the buildings or civil engineering structures comprising these hardened finishes, are also encompassed in the invention.

The applications of this reflective textured, e.g. satin or metallic, finish [preferably "ready to use"] composition, can be also joints/grouts or other products for the construction, as well as mass objects.

BACKGROUND ART

U.S. Pat. No. 6,617,386B2 discloses a textured finish composition comprising an acrylic latex/binder and an aggregate to form the textured composition. The acrylic latex/binder includes water, acrylic latex, defoamer, clay filler, TiO2 slurry, biocide, coalescent, ethylene glycol ammonia and acrylic thickener. The aggregate in this patent is a lightweight expanded mineral that has a density and weight less than sand, for instance, glass microballoons, glass bubbles. The expanded mineral can be silicone encapsulated to avoid the absorption of water.

This known textured finish is light but has not a highly effective appearance.

Moreover, metallic coatings or finishes are well known to provide high degree of reflectivity. They have been utilized in exterior and/or interior surface of a building or structure. Application of a metallic coating or finish on a substrate, is time-consuming and complicated. It involves multi-steps of substrate preparations, prior to spraying the coating/finish on the surface of the substrate. For example, a surface of building structure, such as Expanded PolyStyrene (EPS) substrate, brick and or siding, must be pre-coated with a suitable primer. And then, the coated finish surface must be polished to a very smooth surface prior to spraying a metallic color coat. This process usually involves 5 to 7 steps of preparations up to finish. Therefore, besides the high price of raw material cost of metallic coats/finishes, the labor cost for applying these known metallic coatings/finishes, is also very expensive. See for instance:
https://assets.master-builders-solutions.basf.com/shared/%20documents/pdf/english%20(middle%20east)/tds/senergy/basf-metallic-colour-coat-tds.pdf
or
http://www.dryvit.com/products/metallic-coating/.

In addition to cost and difficulties of implementation, the known metallic coatings finishes should also comply with different specifications, such as:

For the applied and hardened coating/finish: appearance, wear resistance, durability, improved water resistance, UV resistance, possibility of providing a hydrophilic or a hydrophobic surface, as well as biocid properties, and, For the "ready to use" non-hardened coating/finish composition: applicability easiness, improved drying at low temperature and high humidity condition, resistance to dirt pickup, and suitable resistance to sag to allow application onto vertical surfaces of the "ready to use" non-hardened coating/finish composition.

As far as the appearance and aesthetic of the coating/finish is concerned, one of the assessment criteria in this respect, is the reflectivity or the solar reflectance of the coating/finish of applied and hardened on the substrate surface. The reflectivity or the solar reflectance is characteristic of the coatings/finishes with metallic appearance or satin appearance. The solar reflectance is measured according to the standard ASTM E1331-15. The attractive appearance can also come from the texture.

The wear resistance and durability can be appraised by the scrub test according to the standard ASTM D2496.

The water resistance can be assessed by the test according to the "drip test" as described page 17, 1.16 to page 18, 1.20 of WO2012/007529A2.

The applicability easiness can be comprehended through the physical properties of viscosity and wet density.

The resistance to dirt pickup is evaluated by the test described in https://iopscience.iop.org/article/10.1088/1757-899X/182/1/0123037/pdf.

The resistance to sag can be appreciated by the test described in https://en.wikipedia.org/wiki/Sag_resistance_test.

In another technical field, USP No 6887922B1 discloses compositions including epoxy resins (or polyurethane binders, or unsaturated polyester binders or polymethyl-methacrylate binders), a curing agent, pigments and more than 60% W/W of crushed waste glass which grain size ranging between 0.4 and 6 mm. This composition can be laid directly onto a pre-prepared floor surface such as a screed. Once cured, the glass composite forms a coating. This composition can also be trolled into modern for production of 3D dimensional items, such as tiles.

Technical Problem—Objectives of the Invention

In this context, the technical problem at the heart of the present invention is to satisfy at least one of the objectives listed hereinafter:

(i) Providing a novel reflective textured, e.g. satin or metallic, finish [preferably "ready to use"] composition which leads to a, e.g. satin or metallic, finish product (coating/grout/3D object) that has unique physical appearance and which is easy to apply.

(ii) Providing a novel reflective textured, e.g. satin or metallic, finish [preferably "ready to use"] wet composition which leads to a, e.g. satin or metallic, finish product (coating/grout/3D object), with a high degree of solar reflectance for both exterior and interior of a building or structure.

(iii) Providing a novel reflective textured, e.g. satin or metallic, finish [preferably "ready to use"] wet composition which leads to a, e.g. satin or metallic, finish product (coating/grout/3D object), which is highly reflective has a textured appearance, as well as good mechanical properties, in particular a high scrub resistance, a good hardness, an appropriate flexural/compressive strength, and a good cohesion, and also good performance in use as well as a long durability in the hardened form.

(iv) Providing a novel reflective textured, e.g. satin or metallic, finish [preferably "ready to use"] wet composition which leads to a, e.g. satin or metallic, finish product (coating/grout/3D object), which is highly reflective and has a textured appearance, that can be easily sprayed, and which is simple to use and has a consistency and a viscosity insuring a good workability that is sufficiently long to carry out the making of the coating or of the structure, while remaining economical and stable.

(v) Providing a novel reflective textured, e.g. satin or metallic, finish [preferably "ready to use"] wet composition which leads to a, e.g. satin or metallic, finish product (coating/grout/3D object), which is economical, environment friendly and stable at storage.

(vi) Providing a novel reflective textured, e.g. satin or metallic, finish [preferably "ready to use"] wet composition which leads to a, e.g. satin or metallic, finish product (coating/grout/3D object), which contains an entirely organic binder made of polymer dispersion [e.g. acrylic or styrene/acrylic or ethylene/vinylacetate polymer dispersion], with exogenous water and water from the polymer dispersion.

(vii) Providing methods for preparing the wet composition referred to in the above objectives, as well as the method of using the composition through its application onto the surface of buildings or civil engineering works to produce interior or exterior coatings and through its transformation into joints or other 3D structures.

SUMMARY OF THE INVENTION

The present invention pursues at least one of the above objectives by developing r a novel reflective textured, e.g. satin or metallic, finish [preferably "ready to use"] wet composition, which would not have the drawbacks of the known textured finish compositions;

which would not have an adverse effect on the processing properties (easiness and reproducibility of the mixing-workability-pumpability-non-tackiness-shotcreting— . . . )

or on the mechanical characteristics (water-resistance-hardness-durability-cracking strength— . . . ) neither on the protection and waterproofing properties of the hardened plasters, renderings, coatings, grouts or other 3D structures made from these compositions.

It follows that the invention pertains to a reflective textured finish [preferably "ready to use"] composition which makes it possible to get a textured coating having a metallic appearance and a solar reflectance percentage [measured according to ASTM E1331-15] greater than or equal to—in an increased order of preference—: 25; 30; 35; 40; and which comprises:

a) at least one organic binder containing at least one polymer emulsion or dispersion;

b) at least one pigment;

c) from 40 to 90% w/w preferably from 50 to 85% w/w, more preferably from 60 to 80% w/w, of at least one aggregate including:

particles comprising at least 3% V/V of particles which sphericity (SPHT) is less than or equal to 0.5; herein referred to as SPHT/0.5 particles, said % V/V which is given with respect to the whole content of particles, being included in the following ranges given in an increased order of preference: [3-97]; [3-75]; [3-50]; [3-40];

and/or particles which mean roundness (RDNS) is equal to or less than 0.29; said particles being herein referred to as RDNS particles.

The composition according to the invention is a multi-functional metallic finish designed to be used on walls for both exterior and interior applications, to be as used as grouts for kitchen counter tops and/or floor and/or at where for energy saving of solar reflectance, and/or for decorative purposes.

It is to the credit of the inventors to have designed a novel reflective textured, e.g. satin or metallic, finish [preferably "ready to use"] composition which leads to a, e.g. satin or metallic, finish product (coating/grout/3D object) that has unique physical appearance and which is easy to apply, without a long and costly pre-preparation of the surface of the substrate to be coated.

Definitions

According to the terminology of this text, the following non-limitative definitions have to be taken into consideration:

Every singular designates a plural and reciprocally.

"solar reflectance" is measured in accordance with the ASTM E1331-15 method, on samples prepared as described in example 13.

"Sphericity (SPHT)" and "Roundness (RDNS)" are measured using CAMSIZER® P4 which is an instrument designed based on the principle of Dynamic digital Image Analysis (DIA) for testing particle size and particle shape of powders and suspensions. The method of this analysis is described in ISO 13322-2 in which considers the real size and shape of the particles. See the examples for details.

"polymer" refers to homopolymer or copolymer.

"finish" refers to any product for the construction (interior or exterior), e.g.: coatings, joints, mass objects.

"aggregate" refers to a blend of inert particles which contribute to the mechanical cohesion of the hardened finish.

"granulometry" corresponds to the dry sieving $D_{50}$, determined using ASTM D422-63(2007) e2 method "Acrylic" refers to homopolymers or copolymers formed of monomers selected from the group of acrylate esters.

BRIEF DESCRIPTION OF THE DRAWINGS

FIGS. 3*a* and 3*b* show Waddell or Krumbein Roundness, RDNS_C measures the "corner roundness", the opposite of "angularity";

FIGS. 4*a* and 4*b* show hydrophobic property of the disclosed reflective and textured finish surfaces with 2 different colors;

FIGS. 7a and 7b are a comparison of rub resistance between metallic coating (a) and metallic finish (b) after (a) 2500 cycles of scrub test and (b) after 20000 cycles of scrub test; and FIGS. 8a and 8b are multi-functional metallic finish specimens after a ½" (OD)×8" (length) mandrel test.

DETAILED DESCRIPTION OF THE INVENTION

Figure 1:
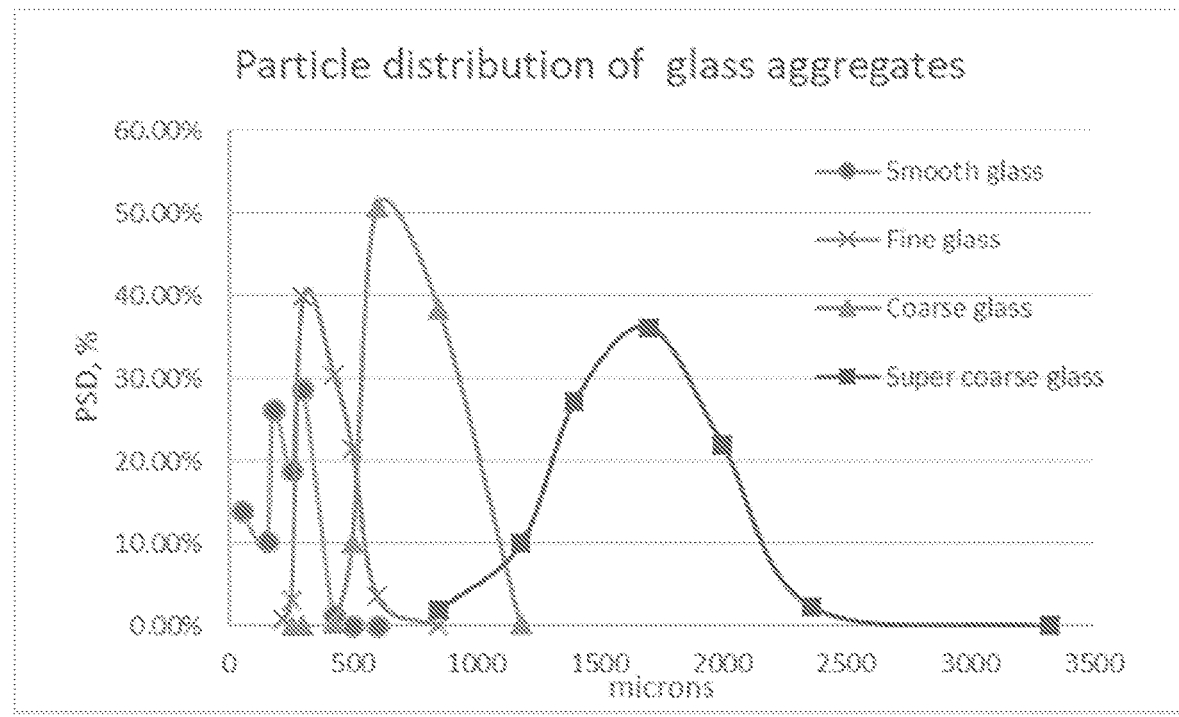
FIG. 1 is a graph depicting particle distribution of glass aggregates.

Composition
Organic Binder a):
In a remarkable variant, the emulsion or dispersion of the organic binder (a) is chosen
among the acrylic emulsions or dispersions, preferably those wherein the polymer of the discontinuous phase is selected:
in the group of polymers comprising, or even better constituted by: acrylic, acrylic, vinyl/acrylic styrene/acrylic, styrene/butadiene, vinyl-acetate/ethylene, vinyl-acetate/versatate and vinyl-acetate/versatate/ethylene polymers;
the acrylic, vinyl/acrylic, styrene/acrylic polymers being preferred
preferably from the subgroup of polymers comprising at least one of the following monomers: n-butyl acrylate, methyl methacrylate, methyl 2-methylprop-2-enoate, methyl 2-propenoate, acrylic ester, styrene, acrylonitrile, butyl acrylate, 2-ethylhexyl acrylate, acrylic acid, methyl acrylate;
among the waterborne polyurethane (PU) dispersions, preferably those prepared:
from polycaprolactonediol and toluene diisocyanate (TDI), with 1,4-butane diol (BDO) as chain extender, and dibutyltin dilaurate catalyst;
from chlorinated poly(ethylene glycol monomethyl ether) (PEGMME) in the presence of sodium hydride (NaH) to get grafted PU;
and from mixtures thereof.
In a peculiar interesting embodiment, the acrylic or styrene/acrylic polymer dispersion of these acrylic finishes are obtained by emulsion polymerisation.

Pigment (b):
In another remarkable variant, the pigment (b) is powdery and/or pasty and/or slurry and chosen from the group comprising, or even better constituted by:
inorganics pigments obtained from inorganic metallic compounds and salts [advantageously chromates], metallic oxides, sulphates;
organic pigments, preferably azo pigments, lake pigments, phthalocyanine pigments and quinacridone pigments;
metallic pigments preferably selected in the group comprising, or even better constituted by: cadmium, chromium, cobalt, copper, iron oxide, lead, manganese, mercury, titanium, zinc, aluminium;
inorganic pigments of carbon, clay earths, ultramarine (lapis lazuli);
organic pigments of alizarin, alizarin crimson, gamboge, cochineal red, rose madder, indigo, Indian yellow, Tyrian purple, quinacridone, magenta, diarylide yellow, phthalo blue, phthalo green, red 170;
and mixes thereof.

Translucent Aggregate (c):
In a particular embodiment, the aggregate (c) SPHT/0.5 particles and/or the aggregate (c) RDNS particles, are chosen from the group comprising, or even better constituted by: a glass and/or a quartz and/or a mica; preferably in the subgroup comprising, or even better constituted by: crushed glass obtained from recycled glass or glass, crushed crystallized quartz and/or mixes thereof.

Advantageously, the aggregate (c) SPHT/0.5 or RDNS particles size belongs to one of the following granulometric classes C1-C4, which correspond to the D50 [in μm and measured according to ASTM D422-63(2007)e2] of the particles—the ranges being given in an increased order of preference—:

C1. $50 \leq D50 \leq 1500$; $100 \leq D50 \leq 800$; $200 \leq D50 \leq 150$;
C2. $100 \leq D50 \leq 2000$; $200 \leq D50 \leq 1500$; $250 \leq D50 \leq 1000$;
C3. $300 \leq D50 \leq 3000$; $400 \leq D50 \leq 2000$; $500 \leq D50 \leq 1500$;
C4. $500 \leq D50 \leq 5000$; $600 \leq D50 \leq 4000$; $800 \leq D50 \leq 3500$.

Others components (d)(e)(f)(g)(h)(i)(j):
In order to optimize its performances, the reflective textured finish composition according to comprises, in addition to components (a), (b), (c), at least one of the following components:
d) at least one rheological agent, (also named as "thickener");
e) at least one hydrophilic or hydrophobic surface modifier,
preferably including silanes and/or silicones and/or siliconates;
preferably in an amount [in % w/w with respect to the whole composition] comprised between 0.1 and 6 and, more preferably, between 0.15 and 4;
f) at least one biocide,
preferably chosen among mineral oxides [advantageously zinc oxide] and at least one active ingredient preferably selected from 5-chloro-2-methyl-4-isothiazolin-3-one, 2-methyl-4-isothiazolin-3-one, 1,2-benzisothiazolin-3-one, diuron[3-(3,4-dichlorophenyl)-1,1-dimethylurea], 3-Iodo-2-propynyl butylcarbamate, 2-N-Octyl-44-isothiazolin-3-one, and mixes thereof;
preferably in an amount [in % w/w with respect to the whole composition] comprised between 0.01 and 1, more preferably, between 0.02 and 0.8, and, even more preferably between 0.05 to 0.04;
g) at least one polymer dispersant, preferably in an amount [in % w/w with respect to the whole composition] comprised between 0.01 and 0.4 and, more preferably, between 0.01 and 0.2;
h) at least one coalescent agent,
preferably chosen in the group of products comprising, preferably consisting of glycol either, sodium triphosphate, the glycol ethers being more preferably chosen in the group of products comprising preferably consisting of ethylene glycol monomethyl ether, ethylene glycol monethyl ether, ethylene glycol monopropyl ether, ethylene glycol monoisopropyl ether, (2-isopropoxy)ethanol, ethylene glycol monobutyl ether, ethylene glycol monphenyl ether, ethylene glycol monobenzyl ether, diethylene glycol monomethyl ether, 2-(2-methoxyethoxy)ethanol, methyl carbitol, diethylene glycol monoethyl ether, 2-(2-ethoxyethoxy)ethanol, carbitol cellosolve, diethylene glycol mono-n-butyl ether, ethylene glycol dimethyl ether, ethylene glycol diethyl ether, ethylene glycol dibutyl ether, ethylene glycol methyl ether acetate, ethylene glycol monoethylether acetate, ethylene glycol monobutyl ether acetate, tripropylene glycol n-butyl ether, dipropylene glycol n-butyle ether, trithylene glycol monobutyl ether, and propylene glycol;

preferably in an amount [in % w/w with respect to the whole composition] comprised between 0.01 and 4, more preferably, between 0.02 and 3, and even more preferably, between 0.05 and 2;

i) at least one defoamer, also named as anti-foaming agent, preferably chosen from a group of products comprising, or even better consisting of long chain fatty alcohol, fatty acid soaps or esters, and/or polymers with silicon backbones, and/or EO/PO based defoamers containing polyethylene glycol and polypropylene glycol copolymers, and/or alkyl polyacrylates, and from mixtures thereof;

preferably in an amount [in % w/w with respect to the whole composition] comprised between 0.01 and 1, more preferably, between 0.02 and 0.8, and even more preferably, between 0.05 and 0.6;

j) water.

Rheological Agent—Thickener—(d).

The possible rheological agent (d) (also named a "thickener") is preferably chosen in the group comprising, more preferably consisting of: clays, starch ethers, cellulose ethers and/or gums (e.g. Welan guar xanthane, succinoglycans), modified polysaccharides—preferably among modified starch ethers—, polyvinylic alcohols, polyacrylamides, clays, sepiolites, bentonites, and their mixes, and more preferably chosen in the group of clays, bentonite, montmorillonite.

The possible rheological agent (d) can be present in an amount [in % w/w with respect to the whole composition] comprised between 0.02 and 4 and, more preferably, between 0.04 and 2.

Hydrophilic or Hydrophobic Surface Modifier (e)

The possible hydrophilic or hydrophobic surface modifier (e) is preferably chosen in the group comprising, more preferably consisting of: silanes and/or silicones and/or siliconates.

The possible hydrophilic or hydrophobic surface modifier (e) can be present in an amount [in % w/w with respect to the whole composition] comprised between 0.1 and 6 and, more preferably, between 0.15 and 4.

Biocide (f)

The possible biocide (f) is preferably chosen in the group comprising, more preferably consisting of: mineral oxides [advantageously zinc oxide] and at least one active ingredient preferably selected from 5-chloro-2-methyl-4-isothiazolin-3-one, 2-methyl-4-isothiazolin-3-one, 1,2-benzisothiazolin-3-one, diuron [3-(3,4-dichlorophenyl)-1,1-dimethylurea], 3-lodo-2-propynyl butylcarbamate, 2-N-Octyl-44-isothiazolin-3-one, and mixes thereof. The possible biocide (f) can be present in an amount [in % w/w with respect to the whole composition] comprised between 0.01 and 1, more preferably, between 0.02 and 0.8, and, even more preferably between 0.05 to 0.04.

Polymer Dispersant (g)

The possible polymer dispersant (g) is preferably chosen in the group comprising, or even better consisting of plasticizers, superplasticizers, non-surface active polymers surface-active substances and mixes thereof, more preferably one or more surfactants.

The possible polymer dispersant (g) can be present in an amount [in % w/w with respect to the whole composition] comprised between 0.01 and 0.4 and, more preferably, between 0.01 and 0.2.

Coalescent Agent (h)

The possible coalescent agent (h) is preferably chosen in the group comprising, more preferably consisting of: glycol either, sodium triphosphate, the glycol ethers being more preferably chosen in the group of products comprising preferably consisting of ethylene glycol monomethyl ether, ethylene glycol monethyl ether, ethylene glycol monopropyl ether, ethylene glycol monoisopropyl ether, (2-isopropoxy) ethanol, ethylene glycol monobutyl ether, ethylene glycol monphenyl ether, ethylene glycol monobenzyl ether, diethylene glycol monomethyl ether, 2-(2-methoxyethoxy)ethanol, methyl carbitol, diethylene glycol monoethyl ether, 2-(2-ethoxyethoxy)ethanol, carbitol cellosolve, diethylene glycol mono-n-butyl ether, ethylene glycol dimethyl ether, ethylene glycol diethyl ether, ethylene glycol dibutyl ether, ethylene glycol methyl ether acetate, ethylene glycol monoethylether acetate, ethylene glycol monobutyl ether acetate, tripropylene glycol n-butyl ether, dipropylene glycol n-butyle ether, trithylene glycol monobutyl ether, and propylene glycol, and mixes thereof.

The possible coalescent agent (h) can be present in an amount [in % w/w with respect to the whole composition] comprised between 0.01 and 4, more preferably, between 0.02 and 3, and even more preferably, between 0.05 and 2.

Defoamer (i) Also Named as Anti-Foaming Agent

The possible defoamer (i) is preferably chosen in the group comprising, more preferably consisting of: long chain fatty alcohol, fatty acid soaps or esters, and/or polymers with silicon backbones, and/or EO/PO based defoamers containing polyethylene glycol and polypropylene glycol copolymers, and/or alkyl polyacrylates, and from mixtures thereof.

The possible defoamer (i) can be present in an amount [in % w/w with respect to the whole composition] comprised between 0.01 and 1, more preferably, between 0.02 and 0.8, and even more preferably, between 0.05 and 0.6.

Water (j)

The composition can contain water in addition to the water of the polymer emulsion/dispersion (a).

The added water amount of the composition can be [in % w/w with respect to the whole composition] comprised between 0 and 40, more preferably, between 0 and 30 and even more preferably, between 0 and 25.

Methods

The present invention also concerns a method for preparing the reflective textured finish composition according to the invention, essentially consisting in mixing components (a), (b), (c), and possibly at least one of the components (d) to (j).

Another object of the invention is the using method essentially consisting in applying the reflective textured finish composition according to the invention, directly onto the surface of buildings or civil engineering works, notably walls, floors, ceilings thereof, to produce interior or exterior dry/hardened finishes, which have notably the form of coatings or joints/grouts.

Another object of the invention is the buildings or civil engineering works or coatings applied thereon or finishes or structures or grouts/joints, obtained from the composition as above defined.

EXAMPLES

In Table 1 lists the raw materials used for making a typical multi-functional metallic finish composition in the examples.

TABLE 1

| Name | Functions |
| --- | --- |
| Acticide CBM2 and MKW2 | Biocides (f) |
| Deefo 2020E | Defoamer (i) |
| Propylene Glycol | Coalescent agents (h) |
| Texanol ™ | |
| API W30C | Surface modifiers (e) |
| SILRES BS45 | |
| Acronal and/or Rhoplex | Acrylic polymers/co-polymers (a) |
| Daotan ® TW6450/30 | Polyurethane dispersion (PUD) (a) |
| Glass aggregates | Aggregates (c) |
| Acrysol ™ ASE 60 | Thickener (d) |
| Bermocoll ® E 481 FQ | Thickener (d) |
| Garamite ®1958 | Dispersants (g) |
| Disperbyk ® 111 | |
| Tamol ®983 | |
| Colorants | Color pigments (b) |
| Water | water (j) |

In the enclosed FIG. 1 are given the particle size (D50 granulometry) distributions of typical glass aggregate used in the examples (smooth:]0-450 μm[, fine: [250 μm-650 μm], coarse: [450 μm-1250 μm] and super coarse: [1000 μm-2500 μm]). The particle size distribution was determined using ASTM D422-63(2007) e2 method.

Example 1

The shapes of aggregate particles (in Table 1) were measured using CAMSIZER® P4 which is an instrument designed based on the principle of Dynamic digital Image Analysis (DIA) for testing particle size and particle shape of powders and suspensions. The method of this analysis is described in ISO 13322-2 in which considers the real size and shape of the particles. The software determines the projection surfaces of the particles within the digital images.

Figure 2:
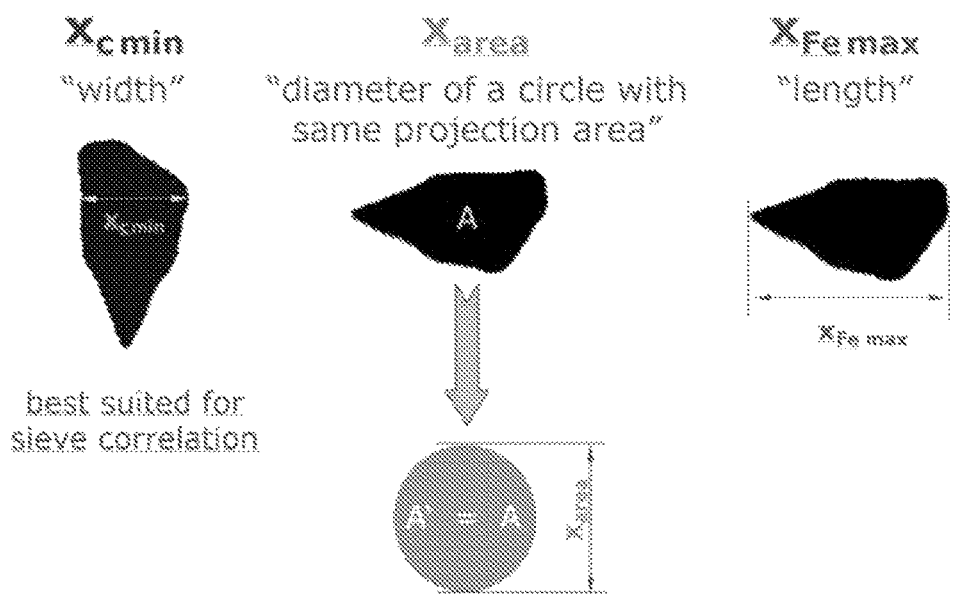
FIG. 2 is a depiction of different size definitions in width, length, and area diameter.

The instrument can detect particle size depending on different size definitions like width, length, or diameter of the equivalent circle area within one measurement run (FIG. 2 which shows different size definitions like width ($X_{c\ min}$), length ($X_{Fe\ max}$) or equivalent area diameter ($X_{area}$) can be used to calculate size distributions.

Particles shape can also be characterized with the parameters such as aspect ratio (b/l), Circularity (sphericity) (SPHT), Symmetry (Symm), Convexity (Conv), and Roundness (RDNS). The definition of each parameter is listed in Table 2 and FIGS. 3a & 3b show: Waddell or Krumbein Roundness, RDNS_C measures the "corner roundness", the opposite of "angularity".

The aggregates used in this invention were characterized using the analytical method described in ISO 13322-2 and Table 2 as well as FIGS. 3a & 3b. Attention was paid on shape measurements, especially the Sphericity (SPHT) and Roundness (RNDS) of aggregate particles.

Table 3 demonstrates some of the results (particles size D50, SPHT & RNDS) from shape measurement of aggregate particles.

TABLE 3

List of shape measurement results of some of aggregates used in this invention

| Sample No | Material nature | Particle size D50 range, microns | w % of particles in aggregate having SPHT = 0.5 | Mean RDNS |
| --- | --- | --- | --- | --- |
| SCG4080 | Glass | 20-600 | 3.40% | 0.28 |
| CC50-200 | Calcium carbonate | 20-550 | 2.40% | 0.3 |
| SS90 | Silica sand | 20-600 | 1.32% | 0.36 |
| AG40-70 | Glass | 20-550 | 6.80% | 0.18 |
| CC4005 | Calcium carbonate | 20-650 | 1.10% | 0.37 |
| SS40-70 | Silica sand | 20-550 | 0.69% | 0.59 |
| VMG20/40 | Glass | 200-1600 | 14.00% | 0.19 |
| CC1640 | Calcium carbonate | 200-1200 | 1.10% | 0.26 |
| SS20/30 | Silica sand | 200-1200 | 0.50% | 0.37 |

Example 2

A reflective textured finish composition was made by the following steps: (1) adding 24.91 w % Acronal® 4600 into a stainless-steel container and mixing the polymer at 350 RPM using a high-shear mixer. (2) adding 2.75 w % API W30C, 0.18 w % Deefo 2020E, 0.18 w % Acticide CBM2, 0.27 w % Propylene glycol into the container under high-shear mixing. (3) pre-weighing 64.11 w % a glass aggregate and then mixing 3.66 w % OX123 Satin silver colorant for use. (4) weighing 0.64 w % Bermocoll® E 481 FQ and mixing it with 2.75 w % water, and then adding into the container. Increasing the mixing speed up to ~450 RPM to achieve a uniform mixture. (5) adding 0.05 w % Aqua Black and 0.004 w % UB05 Universal blue into the mixture. (6) slowly dosing 0.26 w % Acrysol™ ASE60 into the mixture. (7) slowly adding the pre-weighed glass with colorant into the mixture. (8) After a uniform color of mixture achieved, adding 0.05 w % Supersperse 95 and 0.14 w % Acticide MKW2 with a continuous mixing at ~350 RPM for 5 minutes. The finished mixture is taken for further tests of wet density and viscosity.

Example 3

The measurement of wet density of the finished composition was conducted using ASTM C984 method. The measurement of viscosity was carried out using a VISCOMETER manufactured by BROOKFIELD.

Example 4

Another multi-functional metallic finish composition was made by the following steps: (1) adding 19.18 w % Acronal® 4600 into a stainless-steel container and mixing the polymer at ~350 RPM using a high-shear mixer. (2) adding 2.75 w % API W30C and 0.18 w % Deefo 2020E and 0.18 w % Acticide CBM2 and 0.27 w % Propylene glycol as well as 0.37 w % Tamol 983 into the container under high-shear mixing. (3) pre-weighing 54.79 w % glass aggregate and 9.13 w % glass beets and then mixing 3.65 w % OX123 Satin silver colorant for use. (4) weighing 0.27 w % Bermocoll® E 481 FQ and mixing it with 8.4 w % water, and then adding into the container. Increasing the mixing speed up to ~450 RPM to achieve a uniform mixture. (5) adding 0.05 w % Aqua Black and 0.004 w % UB05 Universal blue into the mixture. (6) slowly dosing 0.58 w % Acrysol™ ASE60 into the mixture. (7) slowly adding the pre-weighed glass with colorant into the mixture. (8) After a uniform color of mixture achieved, adding 0.05 w % Supersperse 95 and 0.14 w % Acticide MKW2 with a continuous mixing at 350 RPM for 5 minutes. The finished mixture is taken for further tests of wet density and viscosity.

Example 5

Another reflective textured finish composition was made by the following steps: (1) adding 24.91 w % Rhoplex™ EI 2000 into a stainless-steel container and mixing the polymer at ~350 RPM using a high-shear mixer. (2) adding 2.75 w % API W30C, 0.18 w % Deefo 2020E, 0.18 w % Acticide CBM2, 0.27 w % f Propylene glycol into the container under high-shear mixing. (3) pre-weighing 64.11 w % glass aggregate and then mixing 3.66 w % OX123 Satin silver colorant for use. (4) weighing 0.47 w % Bermocoll® E 481 FQ and mixing it with 2.75 w % water, and then adding into the container. Increasing the mixing speed up to ~450 RPM to achieve a uniform mixture. (5) adding 0.05 w % Aqua Black and 0.004 w % UB05 Universal blue into the mixture. (6) slowly dosing 0.48 w % Acrysol™ ASE60 into the mixture. (7) slowly adding the pre-weighed glass with colorant into the mixture. (8) After a uniform color of mixture achieved, adding 0.05 w % Supersperse 95 and 0.14 w % Acticide MKW2 with a continuous mixing at ~350 RPM for 5 minutes. The finished mixture is taken for further tests of wet density and viscosity.

Example 6

Another reflective textured finish composition was made by the following steps: (1) adding 19.59 w % Rhoplex™ EI 2000 into a stainless-steel container and mixing the polymer at ~350 RPM using a high-shear mixer. (2) adding 2.80 w % API W30C and 0.19 w % Deefo 2020E and 0.19 w % Acticide CBM2, 0.28 w % Propylene glycol as well as 0.47 w % Texanol™ into the container under high-shear mixing. (3) pre-weighing 65.30 w % glass aggregate and then mixing 1.96 w % OX 4503 DARK RED pigment for use. (4) weighing 0.28 w % Bermocoll® E 481 FQ and mixing it with 8.58 w % water, and then adding into the container. Increasing the mixing speed up to ~450 RPM to achieve a uniform mixture. (5) slowly dosing 0.19 w % Acrysol™ ASE60 into the mixture. (6) slowly adding the pre-weighed glass with colorant into the mixture. (7) After a uniform color of mixture achieved, adding 0.05 w % Supersperse 95 and 0.14 w % Acticide MKW2 with a continuous mixing at ~350 RPM for 5 minutes. The finished mixture is taken for further tests of wet density and viscosity.

Example 7

Another reflective textured finish composition was made by the following steps: (1) adding 19.33 w % Acronal® 4600 into a stainless-steel container and mixing the polymer at ~350 RPM using a high-shear mixer. (2) adding 2.76 w % API W30C and 0.18 w % Deefo 2020E and 0.18 w % Acticide CBM2 and 0.28 w % Propylene glycol and 0.37 w % Tamol 983 as well as 0.46 w % Texanol™ into the container under high-shear mixing. (3) pre-weighing 350 parts of a glass aggregate and then mixing 2.58 w % OX 3300 BRIGHT BRASS GOLD pigment for use. (4) weighing 0.28 w % Bermocoll® E 481 FQ and mixing it with 8.47 w % water, and then adding into the container. Increasing the mixing speed up to ~450 RPM to achieve a uniform mixture. (5) slowly dosing 0.48 w % Acrysol™ ASE60 into the mixture. (6) slowly adding the pre-weighed glass with colorant into the mixture. (7) After a uniform color of mixture achieved, adding 0.05 w % Supersperse 95 and 0.14 w % Acticide MKW2 with a continuous mixing at ~350 RPM for 5 minutes. The finished mixture is taken for further tests of wet density and viscosity.

Example 8

Another reflective textured finish composition was made by the following steps: (1) adding 19.42 w % Acronal® 4600 into a stainless-steel container and mixing the polymer at ~350 RPM using a high-shear mixer. (2) adding 2.77 w % API W30C and 0.18 w % Deefo 2020E and 0.18 w % Acticide CBM2 and 0.28 w % Propylene glycol and 0.37 w % Tamol 983 as well as 0.46 w % Texanol™ into the container under high-shear mixing. (3) pre-weighing 64.74 w % glass aggregate and then mixing 2.03 w % OX4560 BRIGHT ORANGE RED pigment for use. (4) weighing 0.18 w % Bermocoll® E 481 FQ and mixing it with 8.47 w % water, and then adding into the container. Increasing the mixing speed up to ~450 RPM to achieve a uniform mixture. (5) slowly dosing 0.67 w % Acrysol™ ASE60 into the mixture. (6) slowly adding the pre-weighed glass with colorant into the mixture. (7) After a uniform color of mixture achieved, adding 0.05 w % Supersperse 95 and 0.14 w % Acticide MKW2 with a continuous mixing at ~350 RPM for 5 minutes. The finished mixture is taken for further tests of wet density and viscosity.

Example 9

Another reflective textured finish composition was made by the following steps: (1) adding 18.66 w % Acronal® 4600 into a stainless-steel container and mixing the polymer emulsion at ~350 RPM using a high-shear mixer. (2) adding 2.67 w % API W30C and 0.18 w % Deefo 2020E and 0.18 w % Acticide CBM2 and 0.27 w % Propylene glycol and 0.36 w % Tamol 983 as well as 0.46 w % Texanol™ into the container under high-shear mixing. (3) pre-weighing 62.21 w % glass for use. (4) adding 5.45 w % AVL Alumi. Aquastab 04/BG9B/65-35 paste pigment. (5) Increasing the mixing speed up to ~450 RPM to achieve a uniform mixture. (6) weighing 0.80 w % Bermocoll® E 481 FQ and mixing it with 8.18 w % water, and then adding into the container. (7) slowly dosing 0.44 w % Acrysol™ ASE60 into the mixture. (8) slowly adding the pre-weighed glass with colorant into the mixture. (9) After a uniform color of mixture achieved, adding 0.04 w % Supersperse 95 and 0.14 w % Acticide MKW2 with a continuous mixing at ~350 RPM for 5 minutes. The finished mixture is taken for further tests of wet density and viscosity.

Example 10

Another reflective textured finish composition was made by the following steps: (1) adding 19.81 w % Acronal® 4600 into a stainless-steel container and mixing the polymer emulsion at ~350 RPM using a high-shear mixer. (2) adding 2.83 w % API W30C and 0.19 w % Deefo 2020E and 0.19 w % Acticide CBM2 and 0.27 w % Propylene glycol and 0.38 w % Tamol 983 as well as 0.44 w % Texanol™ into the container under high-shear mixing. (3) pre-weighing 66.04 w % glass for use. (4) Increasing the mixing speed up to ~450 RPM to achieve a uniform mixture. (5) weighing 0.75 w % Bermocoll® E 481 FQ and mixing it with 46 parts of water, and then adding into the container. (6) slowly dosing 0.19 w % Acrysol™ ASE60 into the mixture. (8) slowly adding the pre-weighed glass with colorant into the mixture. (9) After a uniform color of mixture achieved, adding 0.04 w % Supersperse 95 and 0.14 w % f Acticide MKW2 with a continuous mixing at ~350 RPM for 5 minutes. (10) measuring both wet density and viscosity. (11) adding a color pigment to achieve a desired color.

Example 11

Another reflective textured finish composition was made by the following steps: (1) adding 22.05 w % Acronal® 4600 into a stainless-steel container and mixing the polymer with 2.76 w % API30 at ~350 RPM using a high-shear mixer. (2) adding 0.18 w % Deefo 2020E and 0.18 w % Acticide CBM2 and 0.28 w % Propylene glycol and 0.37 w % Tamol 983 as well as 0.64 w % Texanol™ into the container under high-shear mixing. (3) pre-weighing 64.33 w % glass aggregate for use. (4) Increasing the mixing speed up to ~450 RPM to achieve a uniform mixture. (5) weighing 0.28 w % Bermocoll® E 481 FQ and mixing it with 8.45 w % water, and then adding into the container. (6) slowly dosing 0.29 w % Acrysol™ ASE60 into the mixture. (8) slowly adding the pre-weighed glass with colorant into the mixture. (9) After a uniform color of mixture achieved, adding 0.05 w % Supersperse 95 and 0.14 w % Acticide MKW2 with a continuous mixing at ~350 RPM for 5 minutes. (10) measuring both wet density and viscosity. (11) adding a color pigment to achieve a desired color.

Example 12

The formulated reflective textured finishes (such as examples 2-11) were applied onto the surface of cupboard and dried at ambient conditions (temperature: ~20° C., pressure: 1 atm) overnight. The FIGS. 4a & 4b show hydrophobic property of the disclosed reflective and textured finish surfaces with 2 different colors. When dropping water on the finish surfaces, the water droplets stayed intact (FIGS. 4a & 4b), indicating that the metallic finish surfaces demonstrated hydrophobic property.

Example 13

The reflective textured finishes were applied uniformly onto a 6.5"×4.25" plane surface, and then cured under a temperature of 20° C. and relative humidity of 40%, for at least 7 days before measuring the solar reflectance. After curing, the finish surfaces were examined using ASTM E1331-15 method. A range of 45-58% of solar reflectance was achieved by the multi-functional metallic finishes (FIGS. 5&6) made of glass aggregates, compared with those made of calcium carbonate fillers that have only solar reflectance below 36%.

Figure 5:
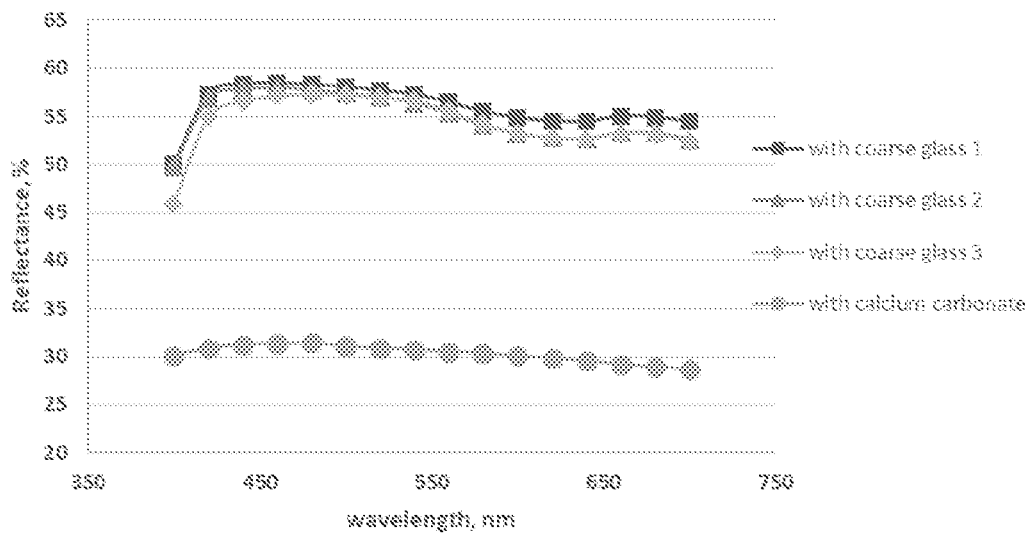
FIG. 5 is a graph depicting solar reflectance of coarse finishes.

FIG. 5 shows the solar reflectance in % as a function of wavelength (nm) of glass aggregates based metallic finishes with coarse texture, in comparison with calcium carbonate based metallic finish with coarse texture.

Figure 6:
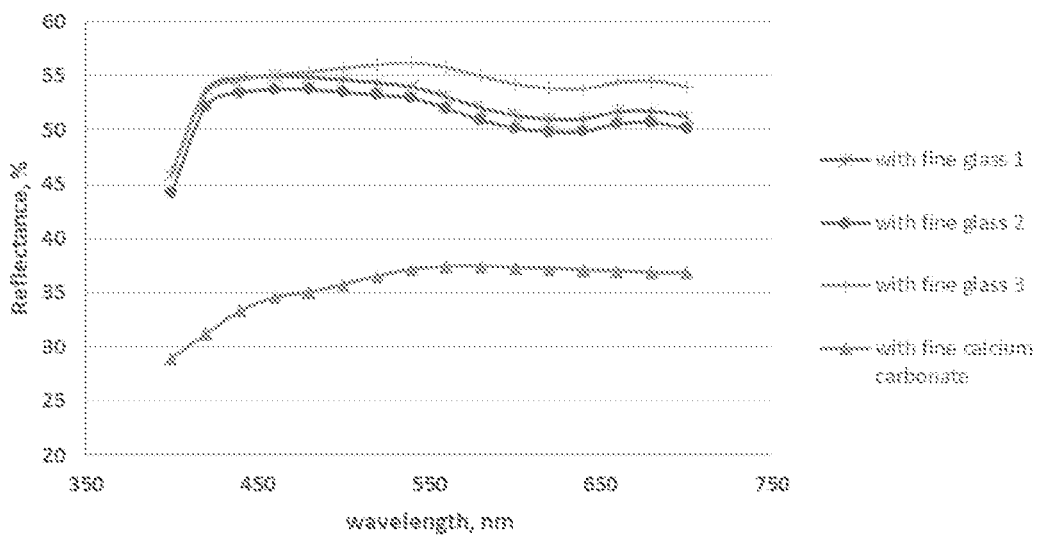
FIG. 6 is a graph depicting solar reflectance of coarse finishes.
Figure 9:
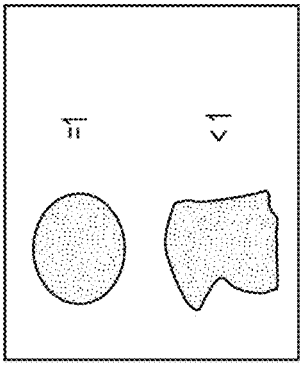
FIG. 9 includes the definitions of shape parameters described in FIGS. 3a and 3b.

FIG. 6 the solar reflectance in % as a function of wavelength (nm) of glass based metallic finishes with fine texture, in comparison with calcium carbonate based metallic finish with fine texture.

"coarse" and "fine" granulometries are defined according to the particles size (D50) ranges as given above in reference to FIG. 1.

Example 14

The reflective textured finish surfaces were tested using ASTM D2486 method for rub resistance. The test was conducted using a brush of BYK-GARDNER AG-8112 and BYK standardized scrub medium abrasive type in conformance with ASTM D2486.

FIGS. 7a & 7b: Comparison of rub resistance between metallic coating (a) and metallic finish (b) after (a) 2500 cycles of scrub test and (b) after 20000 cycles of scrub test. FIG. 7b shows a photo of a typical metallic silver finish from this invention after 20000 cycles of scrubs, in comparison with a metallic silver coating surface (FIG. 7a), that only last 2500 cycles of scrubs, indicating that the reflective textured finishes have excellent rub resistance.

Example 15

The reflective textured finishes were also exposed under the condition of QUV testing (ASTM G154) to simulate outdoor and indoor sun exposure on surface finishes and coatings and polymers. The changes of both solar reflectance and color before and after a period of QUV exposure were monitored using ASTM E1331-15 method. The solar reflectance was measured within visible light which has wavelength ranging from 400 to 700 nm. The change of solar reflectance is calculated using the equation of:

$$\Delta SR = ABS(sum(SRi)\text{initial} - sum(SRi)\text{exposed})/16$$

Where SRi is a solar reflectance value at a specific wavelength i.

The color of the finished surface was described by the parameters of L, a, b. The change of color due to QUV exposure was calculated by the equation of:

$$\Delta E = ((L0-Li)2 + (a0-ai)2 + (b0-bi)2)^{1/2}$$

Where, L0, a0, b0 are the initial color reading of the specimen before QUV test.

Li, ai, bi are the color reading of the specimen after a period of QUV test.

In Table 4 show some typical examples of both changes of solar reflectance (ΔSR) and color (ΔE) of the metallic finish colored specimens after 2000 hours of QUV test. It is obvious that the finished surfaces had little changes after the QUV conditions, revealing that the multi-functional metallic finishes have UV and weathering resistance.

TABLE 4

Both changes of solar reflectance and color after 2000 hours QUV test

| Specimen color | Terracotta | Red | Brown | Silver |
| --- | --- | --- | --- | --- |
| ΔSR | 0.24 | 0.47 | 0.42 | 0.09 |
| ΔE | 0.47 | 0.82 | 0.81 | 0.46 |

Example 16

The reflective textured finish compositions were applied onto a cementitious coated EPS foam sizing as 6" (width)× 12" (length)×1" (thickness). A mandrel bending test was conducted on the specimens according to ASTM D522. The results show that all the specimens passed the test of a ½"×8" mandrel bending without visible cracks and/or fractures on the finish surfaces [FIG. 8: Multi-functional metallic finish specimens after a ½" (OD)×8" (length) mandrel test].

Example 17

Another reflective grout composition was made by the following steps: (1) adding 14 w % Acronal® 5041 mixed into a stainless-steel container and mixing the polymer emulsion at ~350 RPM using a high-shear mixer. (2) adding 0.5 w % Deefo 2020E and 0.15 w % Acticide CBM2 and 0.1 w % Propylene glycol and 0.2 w % Silres BS45 into the container under high-shear mixing. (3) pre-weighing 78.12 w % glass aggregate for use. (4) Increasing the mixing speed up to ~450 RPM to achieve a uniform mixture. (5) weighing 0.05 w % Bermocoll® E481 FQ and mixing it with 1.15 w % water, and then adding into the container. (6) slowly dosing 0.2 w % Acrysol™ TT-615 into the mixture. (8) slowly adding the pre-weighed glass into the mixture. (9) and then adding 0.03 w % Supersperse 95 and 0.15 w % Acticide MKW2 with a continuous mixing at ~350 RPM for 5 minutes. (10) measuring both wet density and viscosity.

Example 18

Another reflective grout composition was made by the following steps: (1) adding 20% w/w Daotan® TW6450/30 into a stainless-steel container; (2) adding 0.8% w/w Dowanol DPnB, 0.2% w/w Acticide MBS5050, 1% w/w water and 0.4% w/w polyurethane based thickener into the container under a high-shear mixing at ~400 RPM. (3) slowly adding 77.6% w/w glass aggregate into the mixture with continuous agitation.

The invention claimed is:

1. A single part reflective textured finish composition capable of forming a textured coating having a metallic appearance and a solar reflectance percentage, measured according to ASTM E1331-15, greater than or equal to 40; the reflective textured finish composition comprising:
    a) at least one organic binder containing at least one polymer emulsion or dispersion;
    b) at least one pigment; and
    c) from 40 to 90% w/w of at least one aggregate including:
    particles comprising at least 3% V/V of particles having a sphericity (SPHT) of less than or equal to 0.5; herein referred to as SPHT/0.5 particles, the % V/V being with respect to the whole content of particles; and/or
    particles having a mean roundness (RDNS) that is equal to or less than 0.29; the particles being herein referred to as RDNS particles,
    wherein the at least one aggregate comprises a glass aggregate.

2. The reflective textured finish composition according to claim 1, wherein the emulsion or dispersion of the organic binder (a) is chosen among:
    acrylic emulsions or dispersions selected from the group of polymers consisting of: acrylic, acrylic, vinyl/acrylic styrene/acrylic, styrene/butadiene, vinyl-acetate/ethylene, vinyl-acetate/versatate and vinyl-acetate/versatate/ethylene polymers; and
    waterborne polyurethane dispersions selected from:
        polycaprolactonediol and toluene diisocyanate with 1,4-butane diol as chain extender, and dibutyltin dilaurate catalyst;
        chlorinated poly(ethylene glycol monomethyl ether) in the presence of sodium hydride to get grafted PU; and
        mixtures thereof.

3. The reflective textured finish composition according to claim 1, wherein the pigment is powdery and/or pasty and/or slurry and chosen from the group consisting of:
    inorganics pigments obtained from inorganic metallic compounds and salts, metallic oxides, sulphates;
    organic pigments;
    metallic pigments;
    inorganic pigments of carbon, clay earths, ultramarine;
    organic pigments of alizarin, alizarin crimson, gamboge, cochineal red, rose madder, indigo, Indian yellow, Tyrian purple, quinacridone, magenta, diarylide yellow, phthalo blue, phthalo green, red 170;
    and mixes thereof.

4. The reflective textured finish composition according to claim 1, wherein the aggregate SPHT/0.5 or RDNS particles size belongs to one of the following granulometric classes C1-C4, which correspond to the D50, in μm and measured according to ASTM D422-63(2007) e2, of the particles:
    C1. 50≤D50≤1500;
    C2. 100≤D50≤2000;
    C3. 300≤D50≤3000; and
    C4. 500≤D50≤5000.

5. The reflective textured finish composition according to claim 1, comprising in addition to components (a), (b), (c), at least one of the following components:
    d) at least one rheological agent, also named as a thickener, in an amount, in % w/w with respect to the whole composition, comprised between 0.02 and 4;
    e) at least one hydrophilic or hydrophobic surface modifier in an amount, in % w/w with respect to the whole composition, comprised between 0.1 and 6;
    f) at least one biocide and at least one active ingredient in an amount, in % w/w with respect to the whole composition, comprised between 0.01 and 1;
    g) at least one polymer dispersant in an amount, in % w/w with respect to the whole composition, comprised between 0.01 and 0.4;
    h) at least one coalescent agent in an amount, in % w/w with respect to the whole composition, comprised between 0.01 and 4;
    i) at least one defoamer, also named as anti-foaming agent, in an amount, in % w/w with respect to the whole composition, comprised between 0.01 and 1; and
    j) water.

6. A method for preparing the reflective textured finish composition according to claim 1, the method comprising mixing components (a), (b), and (c).

7. A method comprising applying the reflective textured finish composition according to claim 1, directly onto a surface of buildings or civil engineering works to produce interior or exterior dry/hardened finishes, which have the form of coatings or joints/grouts.

8. A dry/hardened finish obtained from the method according to claim 7.

9. A building or civil engineering work or coatings or structures obtained from the composition according to claim 1.

* * * * *